United States Patent
Martin et al.

(10) Patent No.: US 7,066,687 B2
(45) Date of Patent: *Jun. 27, 2006

(54) MARINE SEISMIC SURVEYING

(76) Inventors: James Martin, Sandviksveien 93A, N-1322, Hovik (NO); Philip Christie, Teal Cottage, Horse ans Gate Street, Fen Drayton, Cambridgeshire CB4 5SH (GB); Johan Fredrik Naes, Smedsvingen 41, N-1395, Hvalstad (NO); Nicolas Goujon, Agathe Grondahlsgt 10, N-0478, Oslo (NO); Rune Voldsbekk, 2 Strom Terrasse 44, N-3046, Drammen (NO)

(*) Notice: Subject to any disclaimer, the term of this patent is extended or adjusted under 35 U.S.C. 154(b) by 0 days.

This patent is subject to a terminal disclaimer.

(21) Appl. No.: 10/990,572

(22) Filed: Nov. 17, 2004

(65) Prior Publication Data

US 2005/0105392 A1    May 19, 2005

Related U.S. Application Data

(62) Division of application No. 10/275,034, filed as application No. PCT/GB01/01930 on May 2, 2001, now Pat. No. 6,846,133.

(30) Foreign Application Priority Data

May 3, 2000    (GB) .................................. 0010556.9

(51) Int. Cl.
*G01V 1/38*    (2006.01)
(52) U.S. Cl. .................. 405/160; 405/157; 702/14; 367/19
(58) Field of Classification Search .............. 405/157, 405/158, 159–161, 172, 166, 167; 367/15, 367/20
See application file for complete search history.

(56) References Cited

U.S. PATENT DOCUMENTS

| | | |
|---|---|---|
| 4,488,836 A | 12/1984 | Cour |
| 4,537,530 A | 8/1985 | Yamamura et al. |
| 4,641,287 A | 2/1987 | Neeley |
| 4,798,156 A | 1/1989 | Langeland et al. |
| 5,197,716 A | 3/1993 | Zibilich, Jr. et al. |
| 5,284,323 A | 2/1994 | Pawkett |
| 5,442,590 A | 8/1995 | Svenning et al. |
| 5,623,455 A | 4/1997 | Norris |
| 5,724,241 A | 3/1998 | Wood et al. |
| 5,971,665 A | 10/1999 | Hughes |
| 6,024,344 A | 2/2000 | Buckley et al. |
| 6,049,758 A | 4/2000 | Bunks et al. |
| 6,070,857 A | 6/2000 | Dragsund et al. |
| 6,474,254 B1 | 11/2002 | Ambs et al. |
| 6,846,133 B1 * | 1/2005 | Martin et al. ............... 405/160 |

FOREIGN PATENT DOCUMENTS

GB    2376444 A    12/2002

* cited by examiner

*Primary Examiner*—Frederick L. Lagman
(74) *Attorney, Agent, or Firm*—Westerngeco L.L.C.

(57) ABSTRACT

A method of performing a seismic survey of a hydrocarbon reservoir in the earth formations beneath a body of water includes deploying a seismic cable from a drum carried by a remotely operated vehicle on the seabed. The cable is deployed into a lined trench, which is formed either concurrently with cable deployment or during a previous survey, to ensure good repeatability of successive surveys of the reservoir, in order to enable changes in characteristics of the reservoir, eg due to depletion, to be monitored.

20 Claims, 8 Drawing Sheets

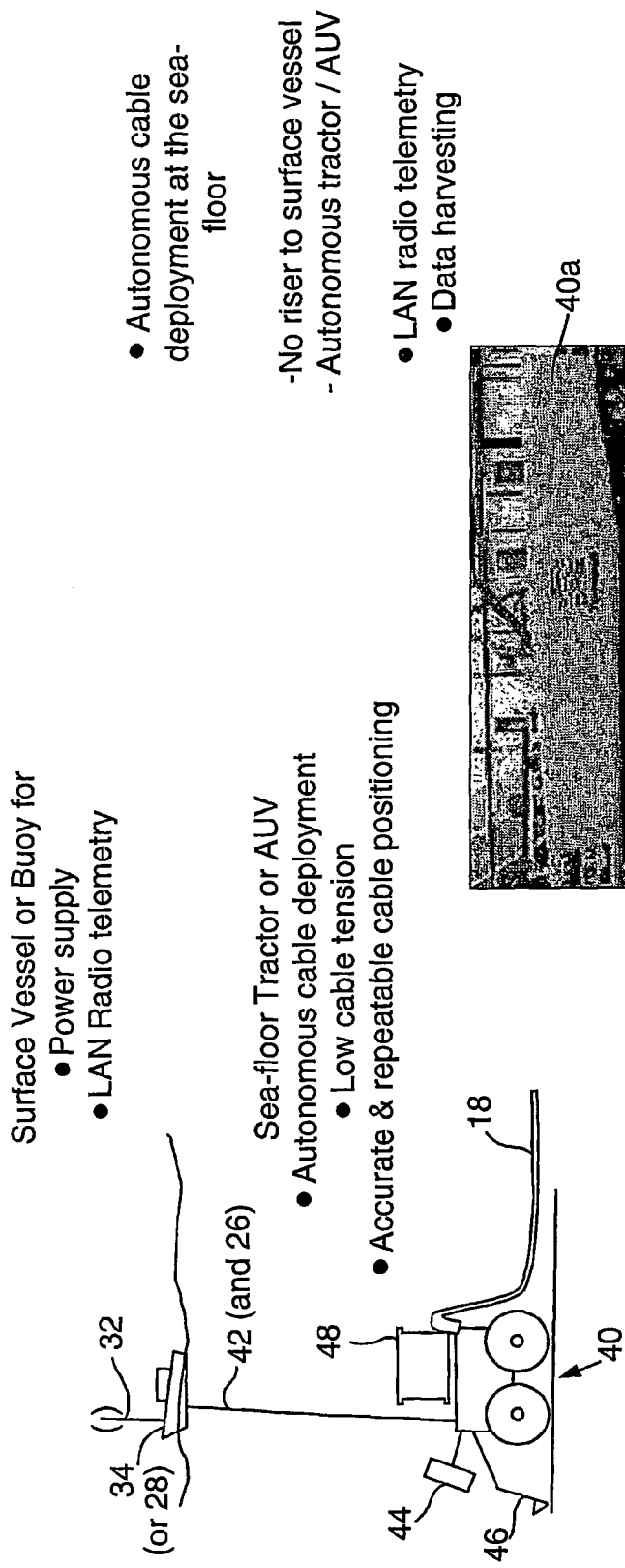
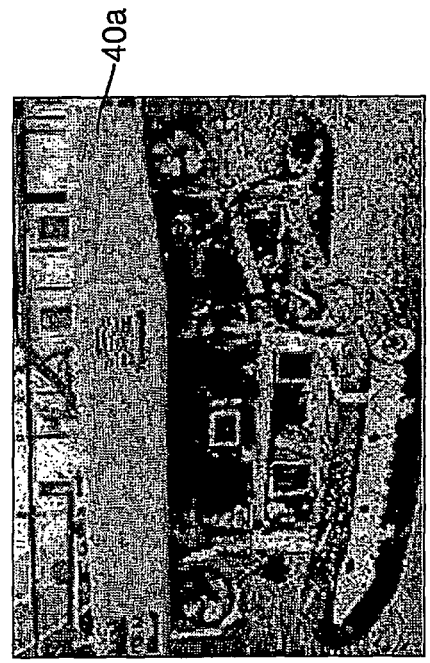
Fig.3A.
Fig.3B.
Cable Handling -sea-floor Tractors
Surface Vessel or Buoy for
• Power supply
• LAN Radio telemetry
Sea-floor Tractor or AUV
• Autonomous cable deployment
• Low cable tension
• Accurate & repeatable cable positioning
• Autonomous cable deployment at the sea-floor
 -No riser to surface vessel
 - Autonomous tractor / AUV
• LAN radio telemetry
• Data harvesting Schematic showing a sea-floor tractor with a domed shaped housing to store sea-floor seismic sensing cables and tilted wheel to enable efficient spooling of the cable onto the winch.

Cable Handling

- Intermediate Solutions:
  - Guide weight, powered
  - Sea-floor plough without share
- Steerable at sea-floor
- Powered by forward motion of vessel

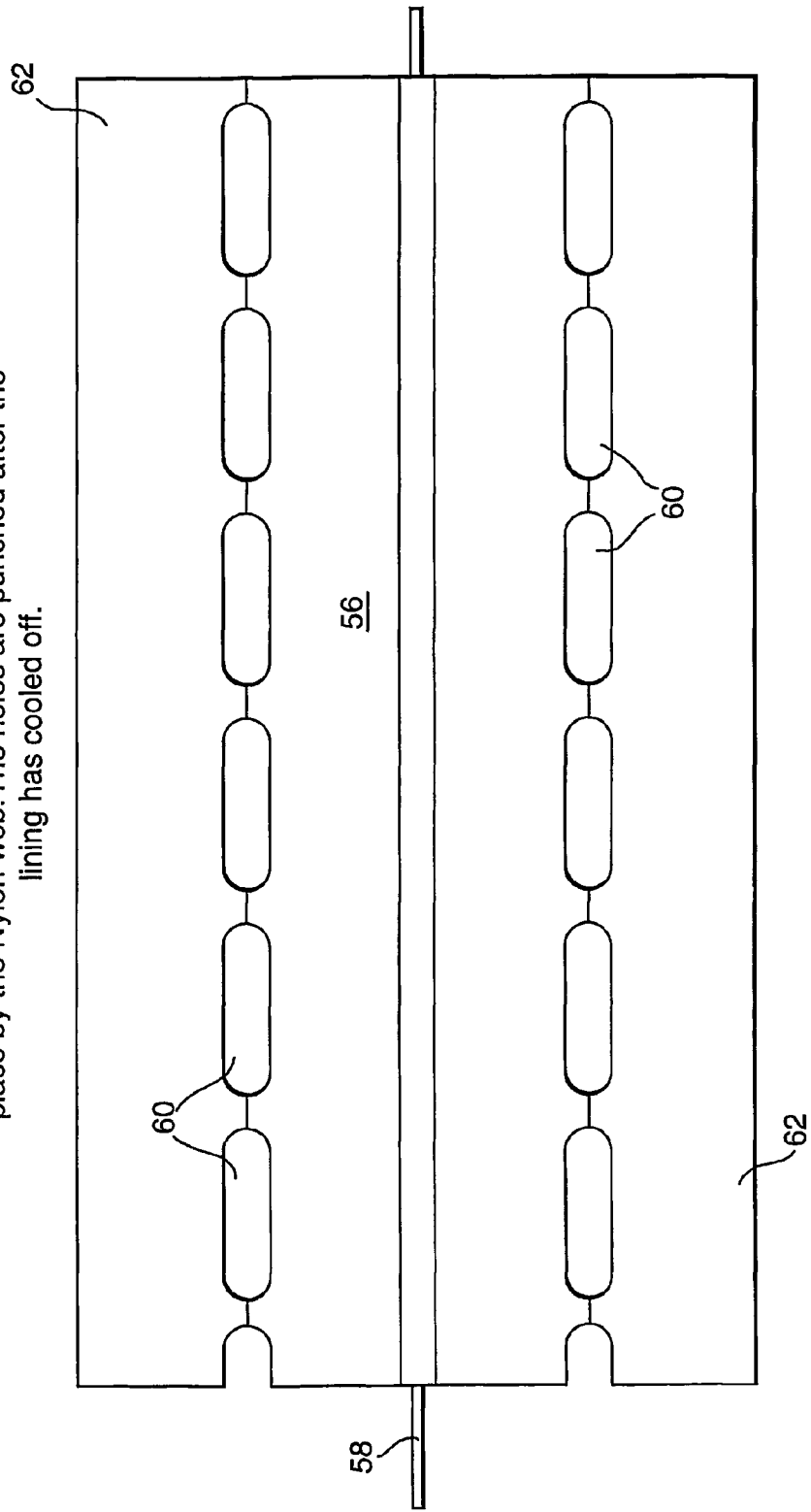

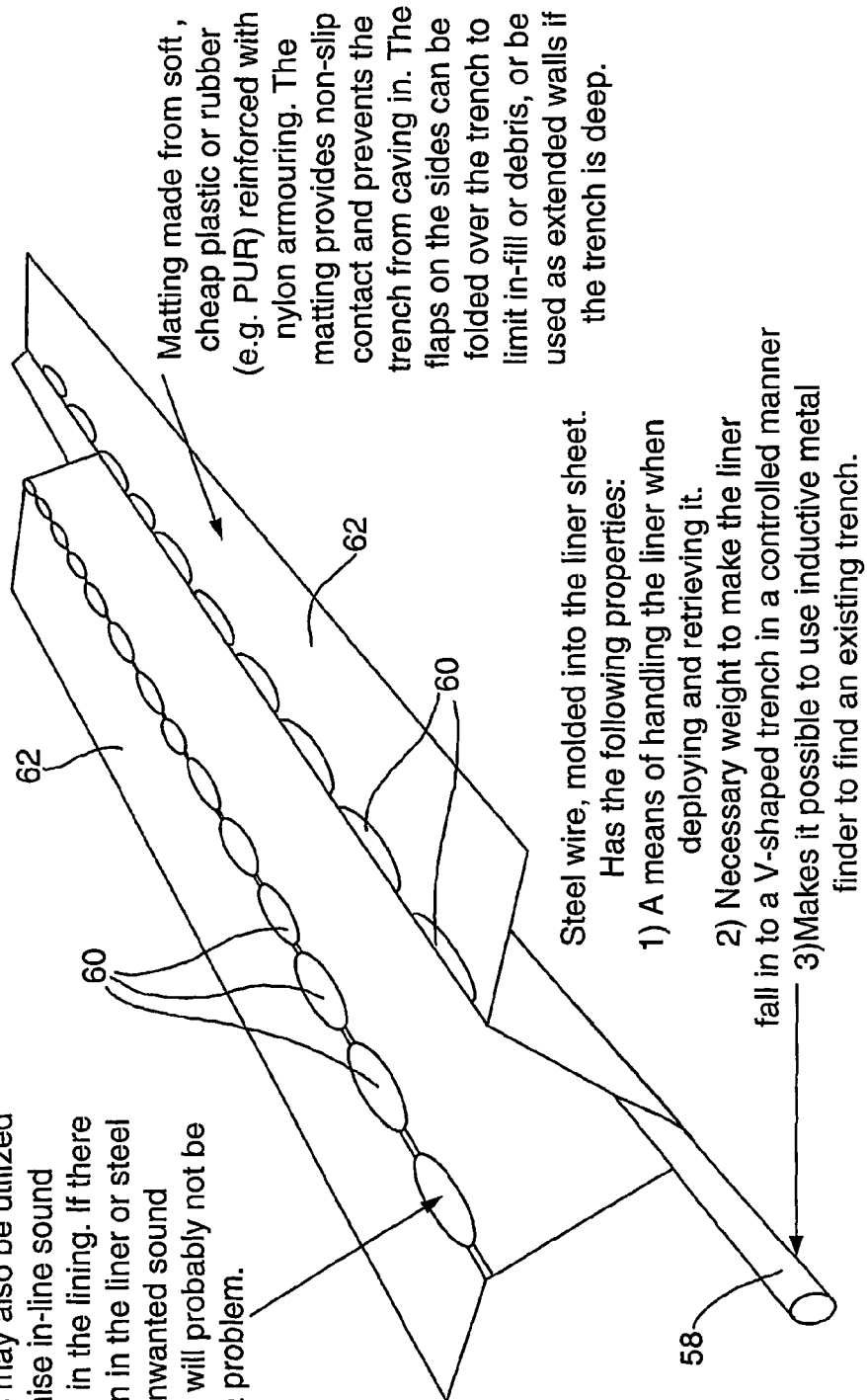

MARINE SEISMIC SURVEYING

This is a divisional of U.S. application Ser. No. 10/275,034, filed Mar. 4, 2003, issued Jan. 25, 2005, as U.S. Pat. No. 6,846,133, which was a 35 U.S.C. § 371 national stage filing from Patent Cooperation Treaty application number PCT/GB01/01930, filed May 2, 2001, which in turn claimed priority from Great Britain patent application number 0010556.9, filed May 3, 2000, from which Applicant has claimed foreign priority under 35 U.S.C § 119.

This invention relates to seismic surveying, and is more particularly concerned with the use of seismic surveying for monitoring hydrocarbon reservoirs beneath the seabed.

In reservoir monitoring, two or more sets of seismic data signals are obtained from the subsurface area containing the reservoir by conducting two or more seismic surveys over the area at different times, typically with time lapses between the seismic surveys varying between a few months and a few years. The acquisition and processing of time-lapsed three dimensional seismic data signals over a particular subsurface area (commonly referred to in the industry as "4D" seismic data) has emerged in recent years as an important new seismic surveying methodology.

The purpose of 4D seismic surveys is to monitor changes in the seismic data signals that can be related to detectable changes in geologic parameters. These (not necessarily independent) geologic parameters include fluid fill, propagation velocities, porosity, density, pressure, temperature, settlement of the overburden, etc. Of primary interest are changes taking place in the reservoir itself. Analysing these changes together with petroleum production data assists the interpreter in understanding the complex fluid mechanics of the system of migration paths, traps, draining or sealing faults making up the reservoir. This provides information regarding how best to proceed with the exploitation of the reservoir, for example where to place new production wells to reach bypassed pay zones and where to place injectors for enhanced oil recovery, and so helps to produce an increased quantity of hydrocarbons from the reservoir, often in a more cost effective way.

An important precondition to being able to map detectable changes of geological parameters is that the sets of seismic data signals which have been acquired at different times must be calibrated so they match each other. The phrase "match each other" in this context means that images of the seismic data signals reflected from places where no geological parameter changes have taken place must appear substantially identical in the different seismic data signal sets. This requires a high degree of repeatability between the successive surveys.

In one prior art method of reservoir monitoring, trenches are formed in the seabed above the reservoir, and seismic cables each having a plurality of seismic sensors distributed along its length are permanently installed in the trenches. A seismic survey of the reservoir is then periodically performed, eg at six or twelve month intervals, by connecting the cables to a seismic survey vessel, typically using a remotely operated vehicle (ROV) on the seabed to effect the connection, and then repeatedly operating a seismic source, eg an airgun array, which is towed by another vessel back and forth in the water above the reservoir.

This prior art method of reservoir monitoring provides quite a high degree of repeatability, but suffers from the disadvantage that the cost of the installed cables is very high, typically several tens of millions of dollars, in relation to the amount of use obtained from them. It is an object of the present invention to alleviate this disadvantage.

According to one aspect of the present invention, there is provided a method of performing a seismic survey of earth formations beneath a body of water, the method comprising the steps of:

(a) deploying a seismic cable having a plurality of seismic sensors distributed therealong in close proximity to elongate locating means provided at the bottom of the body of water;

(b) operating an acoustic source in the body of water to produce seismic signals which enter the formations;

(c) detecting seismic signals which return from the formations with said sensors; and (d) removing the seismic cable from the bottom of the body of water.

The method preferably further includes subsequently redeploying the same or another such seismic cable in close proximity to the locating means and repeating steps (b), (c) and (d).

It will be appreciated that the method of the invention permits the deployment of a seismic cable in substantially the same position at the bottom of the body of water for successive surveys, thus providing a degree of repeatability similar to that achieved with the abovementioned prior art method. However, between the successive surveys, the seismic cable is freed for use for other purposes, eg for monitoring other reservoirs.

The method may also include the step of providing said locating means at the bottom of the body of water, either prior to or substantially concurrently with the first performance of step (a).

In a preferred implementation of the invention, the providing step includes providing locating devices at intervals along the length of the locating means, each locating device serving to uniquely identify a respective point along the length of the locating means.

The locating means may comprise an elongate metallic member such as a cable or rail, in which case the providing step comprises securing said member to, or at least partly burying said member in, the bottom of the body of water.

Alternatively or additionally, the locating means may comprise a trench, in which case the providing step comprises forming said trench in the bottom of the body of water, and step (a) comprises laying the seismic cable in the trench.

Advantageously, the trench forming step includes lining the trench.

According to another aspect of the invention, there is provided a method of performing a seismic survey of earth formations beneath a body of water, the method comprising the steps of:

(a) forming a trench in the bottom of the body of water;

(b) lining the trench;

(c) deploying a seismic cable having a plurality of seismic sensors distributed therealong in the lined trench;

(d) operating an acoustic source in the body of water to produce seismic signals which enter the formations; and (e) detecting seismic signals which return from the formations with said sensors.

In either of the first two aspects of the invention, the trench is preferably lined with a relatively soft, relatively high friction material, such as nylon-reinforced rubber or plastic matting, which is preferably brightly coloured to enhance its visibility at the bottom of the body of water. The material used to line the trench may be made in pre-formed sections, which are preferably installed in the trench so as to be substantially acoustically de-coupled from each other, for example by leaving small gaps between them.

The trench forming step may also include providing the trench with an openable lid, which is also preferably brightly coloured to enhance its visibility at the bottom of the body of water.

The trench forming step may further include providing the trench with guide means, such as a wire, to guide the seismic cable into the trench.

Advantageously, the method includes blowing debris from the trench immediately prior to laying the seismic cable therein.

Conveniently, the step of deploying the seismic cable is carried out using an autonomous or remotely operated vehicle at the bottom of the body of water, while the trench (or other locating means) is preferably provided by the same vehicle.

According to yet another aspect of the invention, there is provided a method of performing a seismic survey of earth formations beneath a body of water, the method comprising the steps of:

(a) deploying a seismic cable having a plurality of seismic sensors distributed therealong at the bottom of the body of water;

(b) operating an acoustic source in the body of water to produce seismic signals which enter the formations; and (c) detecting seismic signals which return from the formations with said sensors;

wherein the step of deploying the seismic cable comprises deploying the seismic cable from a drum of seismic cable carried by an autonomous or remotely operated vehicle at the bottom of the body of water.

The invention will now be described, by way of example only, with reference to the accompanying drawings, of which:

Figure 1:
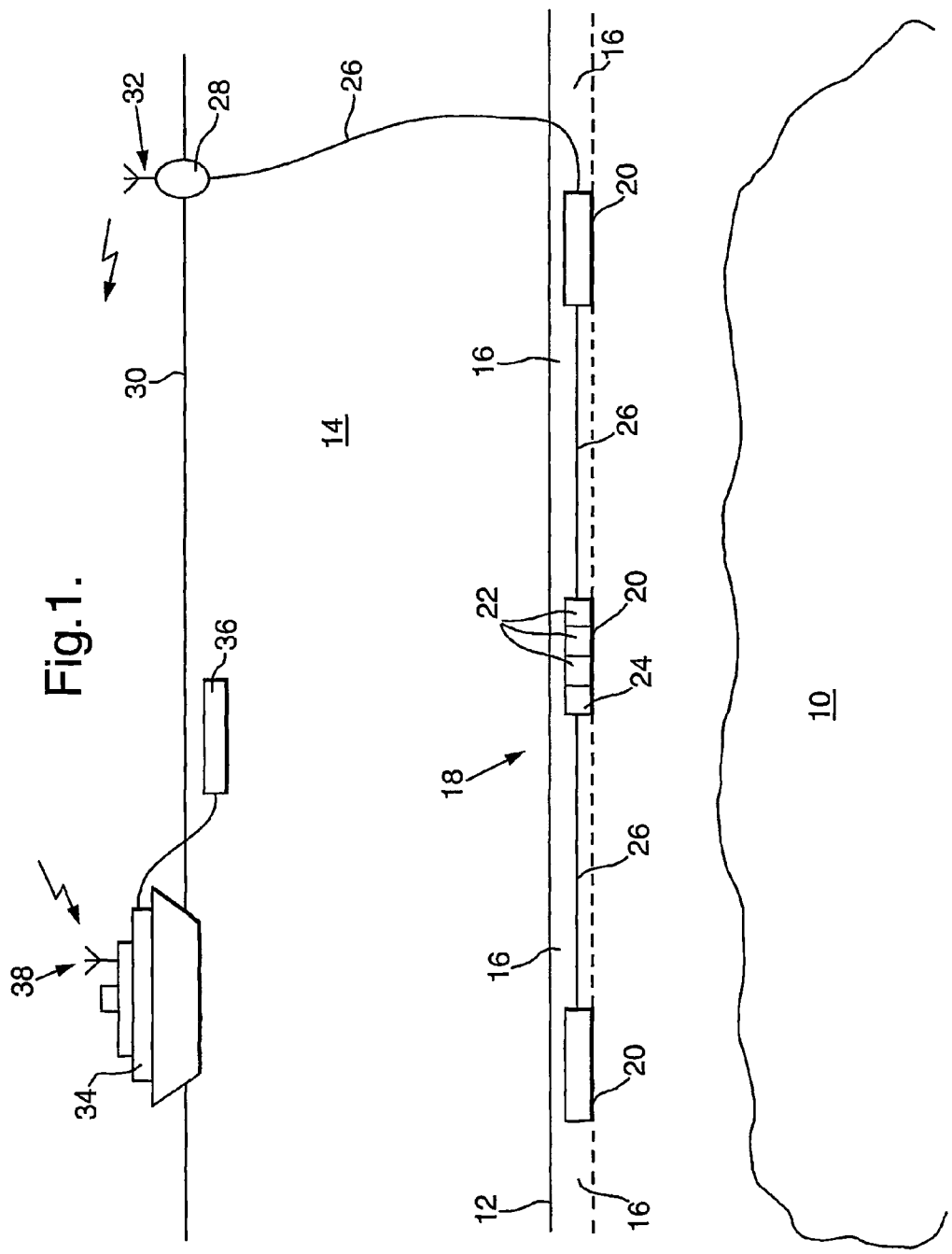
FIG. 1 is a somewhat diagrammatic illustration of a seismic survey being carried out by a method in accordance with the present invention.
Figure 3C:
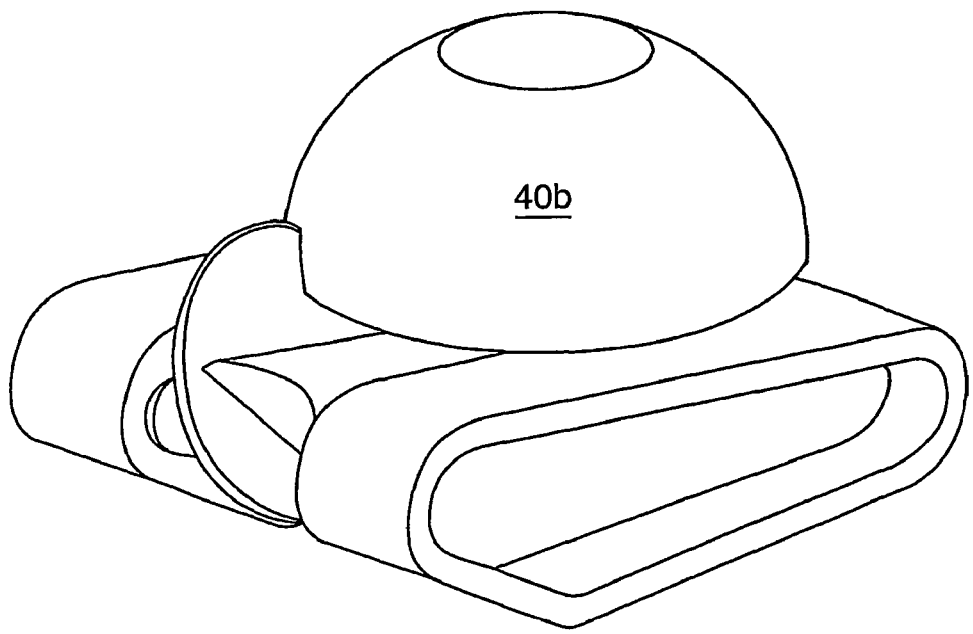
Figure 6:
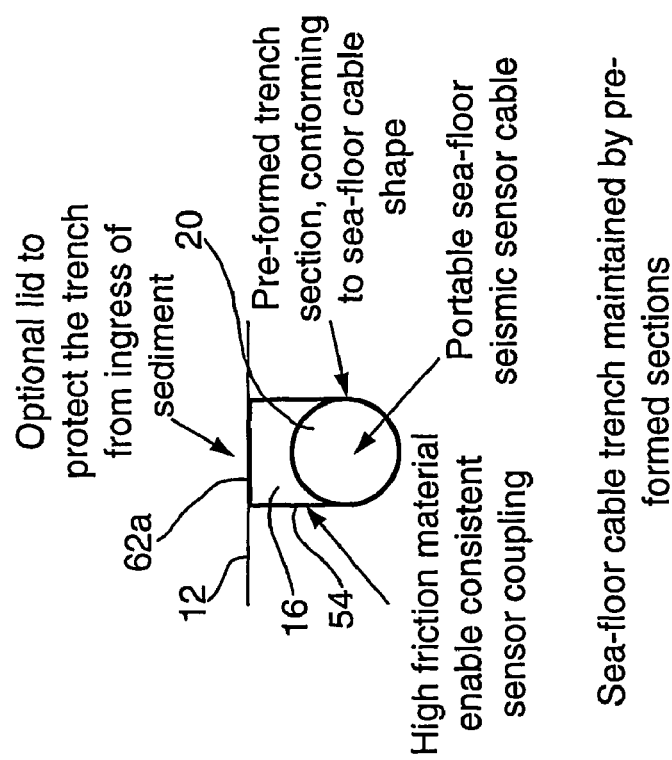
Figure 5:
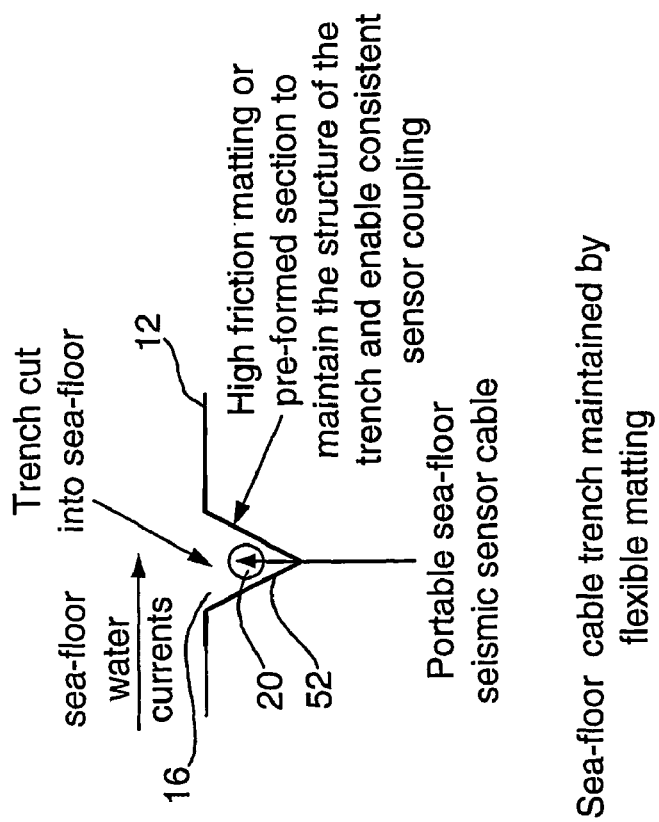

FIG. 3, made up of FIGS. 3A to 3C, and 4 are schematic representations of alternative underwater vehicles that can be used in setting up the seismic survey illustrated in FIG. 1;

FIGS. 5 and 6 illustrate alternative forms of trench used in the method illustrated in FIG. 1; and FIGS. 7 and 8 are enlarged views of a liner for the trench of FIG. 5.

Figure 2:
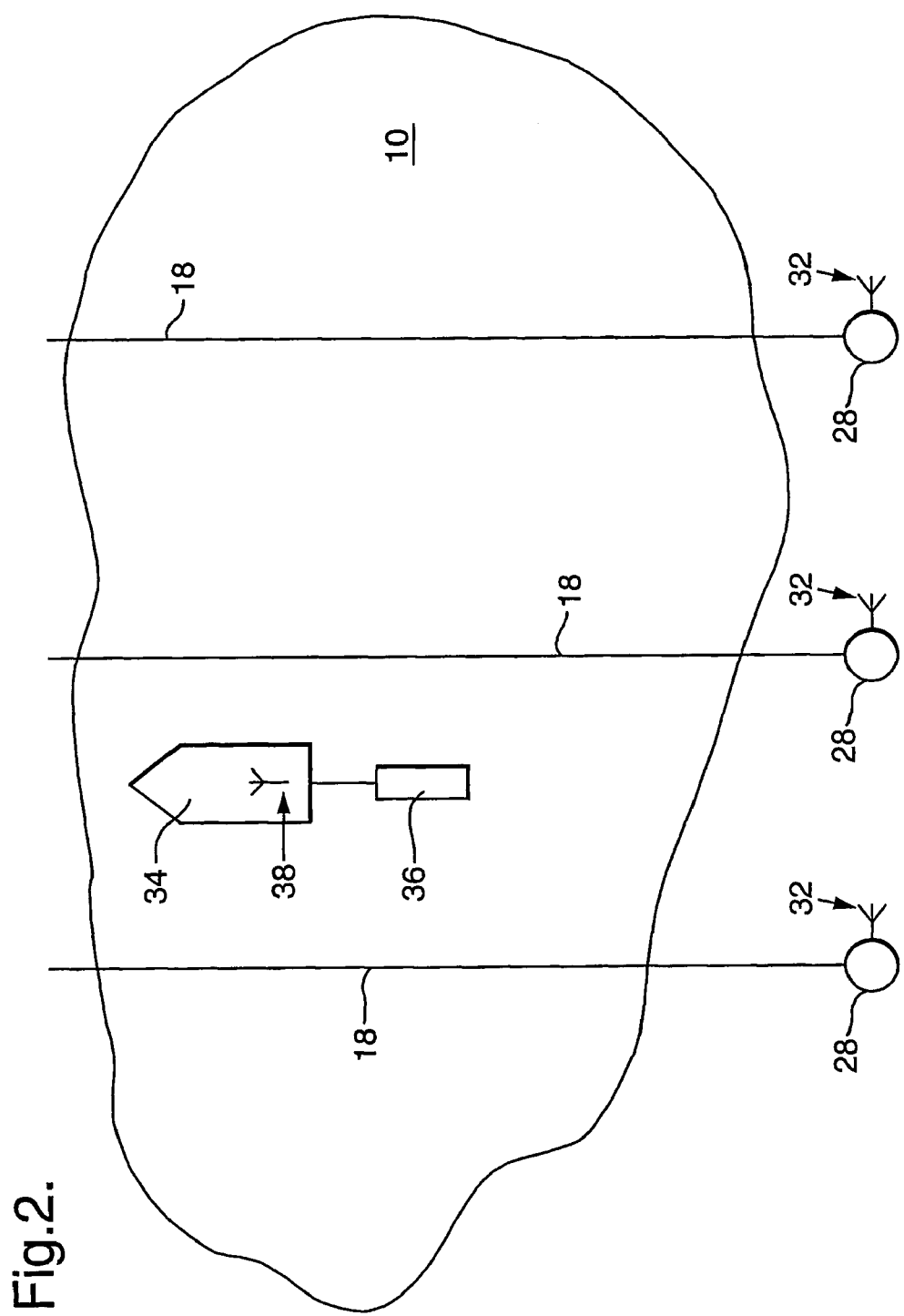
FIG. 2 is a schematic plan view of the seismic survey illustrated in FIG. 1.

The survey illustrated in FIGS. 1 and 2 is designed as one of a series of periodic surveys for monitoring a hydrocarbon reservoir 10 beneath the bottom 12 of a body of water 14. At the start of the series of surveys, several shallow parallel trenches 16 are formed in the bottom 12, as will hereinafter be described. Then, for each survey, a respective seismic cable 18 is deployed in each trench for the duration of the survey, as will also hereinafter be described.

Each seismic cable 18 comprises a plurality of cylindrical metal sensor housings 20 each containing three mutually perpendicular geophones 22 and a hydrophone 24, the sensor housings being interconnected by and substantially uniformly spaced along an electrical cable 26. One end of the electrical cable 26 is connected to a buoy 28 at the surface 30 of the body of water 14, each buoy 28 being equipped with a radio transmitter 32.

To conduct a survey of the reservoir 10, a seismic survey vessel 34 tows a seismic source 36, typically comprising one or more arrays of air guns, back and forth above the area containing the reservoir 10, along substantially parallel shooting lines which are typically (but not necessarily) either parallel or perpendicular to the seismic cable 18. The source 36 is operated (fired) periodically, typically every 4 to 60 seconds, and the seismic signals produced travel downwardly through the water 14 and into the reservoir 10, where they are reflected. The reflected signals are detected by the geophones 22 and the hydrophones 24 in the seismic cables 18, and the detected signals are digitised and transmitted via the electrical cables 26 to respective ones of the buoys 28. The transmitters 32 in the buoys 28 then transmit the detected signals to a receiver 38 on the vessel 34, for on-board processing and/or recording in known manner.

To form the trenches 16 and deploy the cable 18, a remotely operated, electrically powered, wheeled underwater vehicle, indicated at 40 in FIG. 3A and hereinafter referred to as an ROV, is lowered by crane from the vessel 34 to the bottom 12. The ROV 40 is connected to the vessel 34 by a power and control umbilical 42, and is provided with one or more underwater video cameras 44 to permit an operator on the vessel to visually control the ROV. At its front end, the ROV 40 is provided with trench-forming means 46 for forming a trench 16 as the ROV is driven forwardly, while at its rear end, the ROV carries a coil of a soft, relatively high friction, trench-lining material, eg of nylon-reinforced plastic or rubber matting, and means for uncoiling the lining material and pressing it into the just-formed trench. The ROV 40 also carries a driven cable drum 48 containing several thousand metres of the seismic cable 18, and from which the seismic cable is deployed into the lined trench 16. The cable drum 48 is driven to try to ensure as much as is possible that the deployed seismic cable 18 is not laid under tension in the trench 16.

As an alternative to the wheeled ROV 40, tracked versions, indicated at 40a in FIG. 3B and 40b in FIG. 3C, can be used. The tracked ROV 40b of FIG. 3C has a dome shaped to store the seismic cable 18 and a tilted wheel to enable efficient spooling of the cable.

An alternative to using the ROVs 40 and 40a is to use autonomous underwater vehicles powered from and connected to transmit data to respective ones of the buoys 32, as indicated by the bracketted reference numbers in FIG. 3A.

Figure 4:
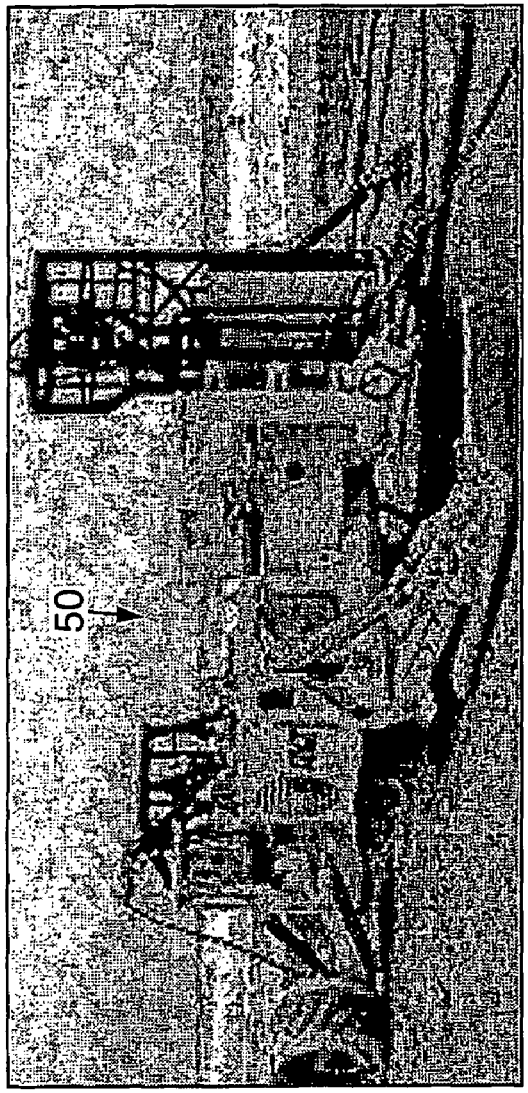

As another alternative to the ROVs 40 and 40a, a steerable, but unpowered, wheeled plough-like vehicle, indicated at 50 in FIG. 4, can be used, the vehicle 50 being towed along the bottom 12 by a tow cable extending up to the vessel 34. This has the advantage of not requiring electric power at the level required to drive the ROVs 40 and 40a along the bottom 12 to be supplied via the umbilical 42.

Suitable underwater vehicles which can be used as a basis for building the ROVs 40, 40a, 40b and 50 are available, for example, from Soil Machine Dynamics Limited, of Newcastle-upon-Tyne, England.

As shown in FIGS. 5 and 6, the trenches 16 can be V-shaped or U-shaped in cross section, the former being preferred because it ensures good coupling between the sensor housings 20 of the seismic cable 18 and the bottom 12 for a wide range of V angles and trench depths.

The trench-lining material, indicated at 52 and 54 in FIGS. 5 and 6 respectively, is brightly coloured to enhance its visibility when viewed via the video camera or cameras carried by the ROV, and has passive transponders (not shown) embedded in it at intervals of, for example, 12.5 metres. These transponders can be of the type described in our PCT Patent Application No WO 00/03268, and each of them contains a unique code defining the position of the transponder along the length of the respective trench 16. A non-contact inductive reader is carried by the ROV to energise and read the transponders, as will become apparent.

FIGS. 7 and 8 show the lining material 52 for the V-shaped trench of FIG. 5 in more detail. As can be seen, the material is initially formed as an elongate flat rectangular sheet 56 having a steel wire 58 moulded into it along its longitudinally extending centre line, and two lines of perforations 60 disposed symmetrically on each side of, and extending parallel to, the steel wire 58. The steel wire 58 and the perforations 60 define respective fold lines enabling the sheet 56 to be folded into the V-shape of the trench 16, with two side portions or flaps 62 which lie on the bottom 12 when the cable 18 is being deployed into the trench. These flaps 62 can also be folded over the top of the trench 16, to serve as a lid to limit the ingress of sand or other debris. The steel wire 58 serves as additional weight to hold the lining material 52 in the trench 16, and also as a means for finding the trench in conditions of poor visibility, as will become apparent.

Once the survey of the reservoir 10 has been conducted as described earlier, the seismic cables 18 are rewound onto their respective cable drum is on the or each underwater vehicle, which is then recovered onto the vessel 34. As a result, the very expensive seismic cables 18 are available for use elsewhere, eg for monitoring another reservoir in a different location.

As an alternative to recovering the cables 18 onto the or each underwater vehicle, the cables can be recovered directly onto drums on the vessel 34.

When it is desired to survey the reservoir 10 again, the vessel 34 (or one like it) deploys an underwater vehicle similar to one of those described earlier and carrying the seismic cable 18 (or a similar seismic cable) onto the bottom 12 above the reservoir 10, as near as possible to the start of one of the trenches 16. The brightly coloured trench-lining material 40 facilitates visual location of the trenches 16 via the vehicle's video cameras. However, if visibility is very poor, the underwater vehicle can be provided with a metal detector to detect and follow the steel wire 58. In either case, transponders can be read to determine how far the vehicle is along the trench 16 in the event it is not initially positioned adjacent one end.

Having located one end of a trench 16, the vehicle deploys the seismic cable 18 into the trench, first opening the lid (if provided) and blowing out any sand or other debris that may have accumulated in the trench with a water jet.

Once all the seismic cables 18 have been deployed, the reservoir 10 is again surveyed as described earlier, whereupon the cables 18 are again recovered.

It will be appreciated that the invention has the advantage that the second survey is conducted with the seismic cables 18 in substantially the same positions they occupied during the first survey, so that repeatability is excellent. The same is also true for subsequent surveys.

Another advantage is that if the first or a later survey shows that some parts of the reservoir 10 are or have become less significant than others, subsequent surveys can be confined to imaging the more significant parts, saving both time and money.

Also, later surveys can reap the benefits of improvements in seismic cable technology, in that up-dated versions of the seismic cable 18 can be used for the later surveys.

Many modifications can be made to the described implementation of the invention.

For example, the trench-lining material 54 can be provided with an integral hinged lid similar to that constituted by the flaps 62 of the material 52, as shown at 62a in FIG. 6. Alternatively, the trench-lining material 52 or 54 can be made in pre-formed sections, which are deployed with small gaps between the sections to reduce the possibility of acoustic coupling between the sections.

The purpose of the trenches 16 is two-fold: to provide good acoustic coupling between the seismic cables 18 and the bottom 12, and to ensure that the seismic cables 18 are deployed as nearly as possible in the same positions on the bottom 12 for each survey. In cases where the bottom 12 is relatively firm and flat, so that good coupling is relatively easily achievable, the trenches 16 can be omitted altogether, and replaced by respective metal cables or rails which are buried in or secured to the bottom 12 along the same lines as are shown in FIG. 2 for the trenches. These cables or rails are deployed at the start of the first survey by an underwater vehicle similar to one of those described earlier, which simultaneously lays the seismic cables 18 parallel to and in close proximity above or beside respective ones of the cables or rails.

In the cable or rail implementation of the invention, the aforementioned transponders can be bonded to the cables or rails. Alternatively, the transponders can bonded to pegs which are hammered into the bottom 12 immediately adjacent the cables or rails, and which serve as guides for the seismic cables 18.

For subsequent surveys, the cables or rails are detected by a suitable metal detector carried by the ROV, and the positions along them identified via the transponders. The ROV then uses its metal detector to guide it along the cable or rail, while simultaneously deploying the seismic cable 18 above or alongside and in close proximity to the detected cable or rail.

In another modification, the buoys 28 are replaced by a single recording vessel which carries a seismic data recording and processing system and which remains stationary during the survey. In this case, the vessel 34 can be a simpler vessel, since it is required only to tow the source 36. The seismic cables 18 can be connected to the stationary recording vessel either via respective riser cables, or by an individual riser cable for, say, each pair of adjacent seismic cables 18. Or the seismic cables 18 can be connected to a common backbone cable, which can if desired be permanently installed on the bottom 12, with a single riser cable being used to connect the backbone cable to the stationary recording vessel.

Finally, instead of deploying the seismic cables 18 from drums carried on underwater vehicles, they can be deployed from drums on a surface vessel, and guided into position on the bottom 12 by a simple ROV, or by an autonomous underwater vehicle, or by a weight, eg a powered weight, co-operating with a respective guide cable provided in each trench 16.

The invention claimed is:

1. A method of performing a seismic survey of earth formations beneath a body of water, the method comprising the steps of:
    (a) forming a trench in the bottom of the body of water;
    (b) lining the trench;
    (c) deploying a seismic cable having a plurality of seismic sensors distributed therealong in the lined trench;
    (d) operating an acoustic source in the body of water to produce seismic signals which enter the formations; and
    (e) detecting seismic signals which return from the formations with said sensors.

2. A method as claimed in claim 1, wherein the trench is lined with a relatively soft, relatively high friction material, such as nylon-reinforced plastic or rubber matting.

3. A method as claimed in claim 2, wherein the material used to line the trench is initially substantially flat, and is provided with fold lines which enable it to be folded into the trench.

4. A method as claimed in claim 3, wherein at least one of the fold lines comprises a line of perforations.

5. A method as claimed in any one of claims 1 to 4, wherein said material incorporates an elongate metal member which after installation of the material in the trench can be used as an elongate locating means.

6. A method as claimed in claim 2, wherein the material used to line the trench is made in pre-formed sections.

7. A method as claimed in claim 6, wherein the pre-formed sections are installed in the trench so as to be substantially acoustically de-coupled from each other.

8. A method of performing a seismic survey of earth formations beneath a body of water, the method comprising the steps of:
  (a) forming a trench in the bottom of the body of water;
  (b) lining the trench, wherein the trench is lined with a relatively soft, relatively high friction material, the material made in pre-formed sections, thereby forming a lined trench;
  (c) deploying a seismic cable having a plurality of seismic sensors distributed therealong in the lined trench;
  (d) operating an acoustic source in the body of water to produce seismic signals which enter the formations; and
  (e) detecting seismic signals which return from the formations with said sensors.

9. A method as claimed in claim 8, wherein the pre-formed sections are installed in the trench so as to be substantially acoustically de-coupled from each other.

10. A method as claimed in claim 8, wherein the material used to line the trench is brightly colored, to enhance its visibility at the bottom of the body of water.

11. A method as claimed in claim 8, wherein the trench forming step includes providing the trench with an openable lid.

12. A method as claimed in claim 11, wherein the lid is made from a brightly colored material, to enhance its visibility at the bottom of the body of water.

13. A method as claimed in claim 8 further comprising guiding the seismic cable in to the trench using a guide means in the trench.

14. A method as claimed in any one of claims 1 to 4 and 6 to 8 further including blowing debris from the trench immediately prior to laying the seismic cable therein.

15. A method of performing a seismic survey of earth formations beneath a body of water, the method comprising the steps of:
  (a) forming a trench in the bottom of the body of water employing an autonomous or remotely operated vehicle at the bottom of the body of water;
  (b) lining the trench;
  (c) deploying a seismic cable having a plurality of seismic sensors distributed therealong in the lined trench;
  (d) operating an acoustic source in the body of water to produce seismic signals which enter the formations; and
  (e) detecting seismic signals which return from the formations with said sensors.

16. A method as claimed in claim 15, wherein the trench is lined with a relatively soft, relatively high friction material, such as nylon-reinforced plastic or rubber matting.

17. A method as claimed in claim 16, wherein the material used to line the trench is initially substantially flat, and is provided with fold lines which enable it to be folded into the trench.

18. A method as claimed in claim 17, wherein at least one of the fold lines comprises a line of perforations.

19. A method as claimed in any one of claims 16 to 18, wherein said material incorporates an elongate metal member which after installation of the material in the trench can be used as an elongate locating means.

20. A method as claimed in claim 16, wherein the material used to line the trench is made in pre-formed sections.

* * * * *